United States Patent
Nefcy et al.

(10) Patent No.: US 9,145,862 B2
(45) Date of Patent: Sep. 29, 2015

(54) HYBRID ELECTRIC VEHICLE ENGINE STARTING WITH A PRELOADED DAMPER SPRING

(71) Applicant: FORD GLOBAL TECHNOLOGIES, LLC, Dearborn, MI (US)

(72) Inventors: Bernard D. Nefcy, Novi, MI (US); Wei Liang, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 13/904,112

(22) Filed: May 29, 2013

(65) Prior Publication Data

US 2014/0352492 A1    Dec. 4, 2014

(51) Int. Cl.

| F02N 11/00 | (2006.01) |
|---|---|
| F02N 5/02 | (2006.01) |
| B60W 20/00 | (2006.01) |
| F02N 11/08 | (2006.01) |
| F02N 15/02 | (2006.01) |
| F16F 15/12 | (2006.01) |

(52) U.S. Cl.
CPC ............... *F02N 11/00* (2013.01); *B60W 20/00* (2013.01); *F02N 11/08* (2013.01); *F02N 15/022* (2013.01); *F16F 15/12* (2013.01); *F02N 5/02* (2013.01); *Y10T 74/134* (2015.01)

(58) Field of Classification Search
CPC ..... B60W 10/00; B60W 10/08; B60W 20/00; Y10T 74/134; F16F 15/12; F02N 15/022; F02N 11/08; F02N 11/00; F02N 5/02
USPC .......................................................... 123/179.1
See application file for complete search history.

(56) References Cited

U.S. PATENT DOCUMENTS

| 4,729,465 | A | * | 3/1988 | Reik | .......................... 464/68.41 |
|---|---|---|---|---|---|
| 6,524,190 | B1 | * | 2/2003 | Strauss | ........................ 464/64.1 |
| 7,571,659 | B2 | * | 8/2009 | Horikoshi | ............................ 74/6 |
| 7,621,246 | B2 | * | 11/2009 | Tohyama | ................. 123/179.24 |
| 8,578,904 | B2 | * | 11/2013 | Sakuma | .................... 123/185.14 |
| 2002/0152980 | A1 | * | 10/2002 | Ahner et al. | ................ 123/179.3 |
| 2012/0234282 | A1 | * | 9/2012 | Sakuma | .................... 123/179.25 |
| 2014/0128218 | A1 | * | 5/2014 | Ruder et al. | ....................... 477/5 |

FOREIGN PATENT DOCUMENTS

| CN | 102308108 A | 1/2012 |
|---|---|---|
| EP | WO2004053350 A1 | 6/2004 |
| JP | 2002526326 A | 8/2002 |
| JP | 2006226353 A | 8/2006 |
| JP | 4848560 B2 | 12/2011 |
| WO | WO2011/105240 A1 * | 9/2011 |

* cited by examiner

*Primary Examiner* — Hieu T Vo
*Assistant Examiner* — Arnold Castro
(74) *Attorney, Agent, or Firm* — David B. Kelley; MacMillan, Sobanski & Todd, LLC

(57) ABSTRACT

A method for starting an engine includes preloading a spring of a torsion damper by transmitting torque having a magnitude less than engine cranking torque from an electric motor through a clutch to the spring, before cranking the engine, increasing a torque capacity of the clutch, and using the electric motor to crank the engine in response to a command to start the engine.

17 Claims, 2 Drawing Sheets

HYBRID ELECTRIC VEHICLE ENGINE STARTING WITH A PRELOADED DAMPER SPRING

BACKGROUND OF THE INVENTION

1. Field of the Invention

This invention relates generally to a method for starting an engine of a hybrid electric vehicle (HEV) by transmitting torque from a starting motor through a clutch and damper to the engine.

2. Description of the Prior Art

A modular hybrid transmission (MHT) is an arrangement of powertrain components that produces parallel hybrid electric drive (HEV). The powertrain includes a torsion damper, transmission pump, electric machine and torque converter arranged in series between an engine and a transmission.

During an engine restart, the torsion damper may bottom out or oscillate due to the large torque used to crank the engine. This bottoming of the damper may damage the flywheel or adversely affect control of engine restarts, which should be consistent. The engine restart may occur using a dual mass flywheel.

SUMMARY OF THE INVENTION

A method for starting an engine includes preloading a spring of a torsion damper by transmitting torque having a magnitude less than engine cranking torque from an electric motor through a clutch to the spring, before cranking the engine, increasing a torque capacity of the clutch, and using the electric motor to crank the engine in response to a command to start the engine.

The method reduces engine oscillation at starting and reduces the variability of an engine start.

The method reduces the length of an engine start by eliminating the need to produce spring displacement after an engine controller issues a command to start the engine. When an engine restart is imminent, the damper is preloaded through a disconnect clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
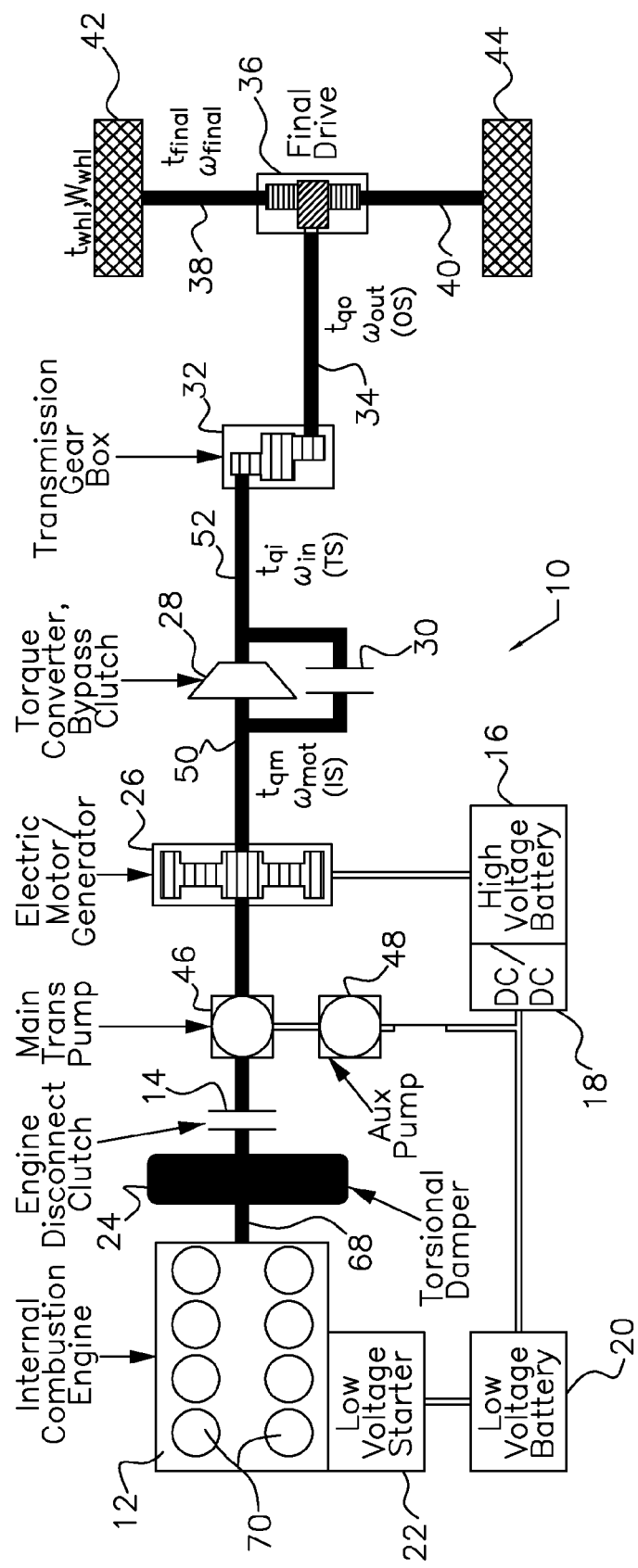
FIG. 1 is a schematic diagram showing an arrangement of components related to the powertrain for a HEV.

FIG. 1 illustrates an MHT configuration of powertrain 10 components that includes an internal combustion engine 12, an engine disconnect clutch 14, a high voltage battery 16, a high voltage to low voltage DC/DC converter 18, low voltage battery 20, low voltage starter 22, torsion damper 24, electric machine 26, torque converter 28, torque converter bypass clutch 30, transmission gear box 32, driveshaft 34, final drive gearing 36, halfshafts 38, 40, and driven wheels 42, 44.

The torsion damper 24 comprises a coiled spring or a mechanism that includes multiple coiled springs, wherein torsion applied to the damper causes displacement of the spring mechanism.

A main transmission pump 46, driven by the motor 26, supplies pressurized hydraulic fluid to the hydraulic system of the transmission 32 and the torque converter 28. An auxiliary oil pump 48, driven by an electric motor (not shown), supplies pressurized hydraulic fluid to the hydraulic system of the transmission 32 and the torque converter 28 when the engine is off.

The internal combustion engine (ICE) 12 is connected to the electric machine 26 and transmission 32 through the disconnect clutch 14, which can engage and disengage the engine from the powertrain to satisfy operational requirements of the hybrid vehicle in different modes.

The high voltage electric machine 26 is secured to the impeller shaft 50 of the torque converter 28. The electric machine 26 is powered by the high voltage battery 16.

The HEV powertrain 10 could share the same transmission hardware with conventional vehicles but different control algorithm, e.g. a regular step ratio transmission could be used in the powertrain to drive the vehicle.

The torque converter 28 used in this configuration is preferably identical to the torque converter used in conventional automatic transmissions. When bypass clutch 30 is open, differential speed between the transmission input shaft 52 and the impeller shaft 50 is possible. When the bypass clutch 30 is closed the torque converter impeller and turbine are mechanically connected, in which case the speed of the electric machine 26 and transmission input 52 are substantially identical.

Alternatively, other types of automatic transmissions can be used in the MHT powertrain 10, e.g. a continuously variable transmission (CVT) having a drive belt engaged with a two pulleys, or an automatic manual transmission. The overall hybrid operation is similar but details of the mechanism disconnecting the motor from the transmission are different.

The torsion damper 24 is a mechanical component having the primary function of modulating or eliminating high frequency torsional vibration from the powertrain 10. The engine 12 is cranked to start by the high voltage motor 26.

To reach the minimum torque for an engine start, a spring in the damper 24 is wound torsionally to a reference angular displacement. A period of a few hundred milliseconds is required before angular displacement of the spring is sufficient. During this period the damper spring stores potential energy transmitted by the motor 26. Such angular displacement of the spring during this process is absent from a conventional vehicle powertrain, in which a geared starter motor is used to crank the engine directly.

Figure 2:
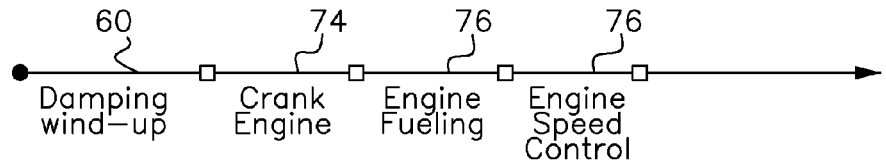
FIG. 2 shows steps in the method for starting the engine of FIG. 1.
Figure 3:
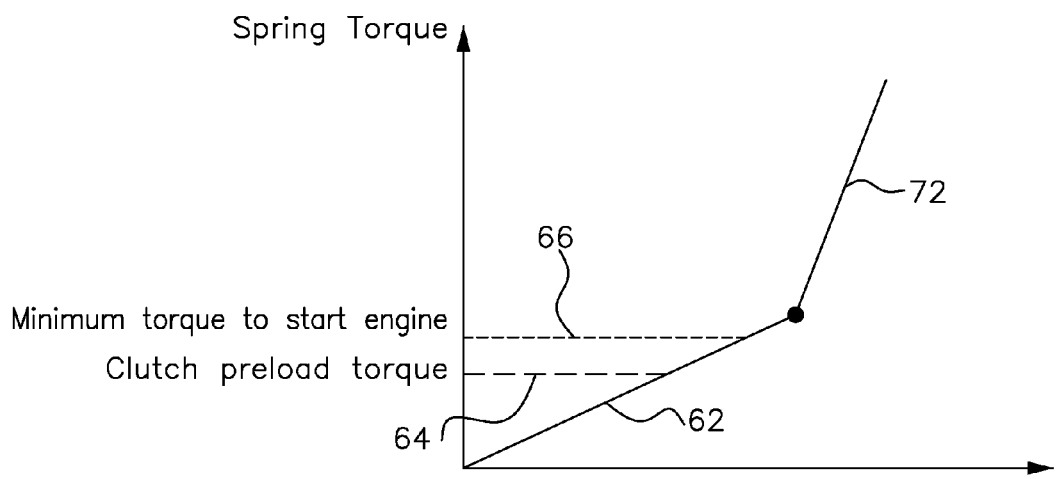
FIG. 3 is a graph showing the variation of spring displacement and spring torque during the engine starting method.

FIG. 2 shows the sequential steps or phases of an engine start of a conventional powertrain. Storing potential energy in a damper occurs in the first phase 60 by producing angular displacement of the damper's spring mechanism. Preferably the damper spring mechanism has two stages of elastic stiffness, as shown in FIG. 3. The first stage spring constant 62 is lower than spring constant 72 so that a relatively large spring displacement, either angular or axial displacement, occurs.

The period required for an engine start in powertrain 10 is shortened by eliminating the first phase 60 from the engine starting method steps that are executed after a signal representing a command to start the engine 12 issues from an engine controller. That period is shortened because, when an engine start is imminent and before the engine is cranked, a powertrain controller actuates the disconnect clutch 14, preferably using hydraulic pressure, to produce a torque transmitting capacity 64 of clutch 14 such that the spring mechanism of damper 24 is preloaded with potential energy transmitted through clutch 14 from the electric machine 26 functioning as a starting motor.

The preload torque on the clutch 14 should be slightly less than the minimum torque 66 required to rotate the engine crankshaft 68 from a stationary position, i.e., less than engine cranking torque. The minimum torque 66 to crank the engine 12 is determined with reference to the static friction torque of the engine crankshaft 68, the engine auxiliary load and the torque required for the engine's pistons to compress air in the engine cylinders 70.

When an engine start is commanded by the control system, the torque capacity of clutch 14 is increased sufficiently such the clutch can transmit torque having a magnitude greater than the engine cranking torque 66 to the engine crankshaft 68 through the damper 24 from electric machine 26. Damper 24 may have a second operating range whose spring constant 72 is greater than spring constant 62. However, while the engine 12 is being cranked by the electric machine acting as a starting motor 26, the spring constant of the damper 24 is in the lowest range 62, regardless of the number of spring constants of the damper 24.

When the magnitude of torque applied to the crankshaft of engine 12 exceeds the minimum torque for an engine start, the engine 12 enters the cranking phase 74. Thereafter, fuel 76 is supplied to engine 12, and engine speed is controlled 78 to engine idle speed, thereby completing the engine starting procedure.

The low voltage starter 22 is used to start the engine when electric power is absent, such as when the charge of the high voltage battery 16 is insufficient to crank and start the engine through operation of the electric machine 26, clutch 14 and damper 24, as described.

In accordance with the provisions of the patent statutes, the preferred embodiment has been described. However, it should be noted that the alternate embodiments can be practiced otherwise than as specifically illustrated and described.

The invention claimed is:

1. A method for starting an engine, comprising:
   (a) before cranking the engine, preloading a spring of a torsion damper by transmitting torque from an electric motor through a clutch to the spring, the clutch partially engaged to only allow less than a torque required to crank the engine;
   (b) after step (a), increasing a torque capacity of the clutch;
   (c) using the electric motor to crank the engine in response to an engine start command.

2. The method of claim 1 wherein preloading the spring further comprises producing angular displacement of the spring.

3. The method of claim 1, wherein preloading the spring further comprises producing displacement of the spring.

4. The method of claim 1, wherein step (a) further comprises determining said magnitude of torque with reference to one of static friction torque of an engine crankshaft, engine auxiliary load and torque required for engine pistons to compress air in engine cylinders.

5. The method of claim 1, wherein the spring is preloaded through a range of spring displacement wherein a relatively low spring constant is operative.

6. The method of claim 1, wherein the spring performs as a damper through a range of spring displacement wherein a relatively high spring constant is operative while the engine is cranked and after the engine is started.

7. The method of claim 1, wherein in step (b) the torque capacity of the clutch is increased to a magnitude greater than a magnitude of the engine cranking torque.

8. The method of claim 1, wherein step (c) further comprises:
   supplying fuel to the engine; and
   controlling engine speed to engine idle speed.

9. The method of claim 1 wherein:
   step (a) further comprises transmitting the torque in a first direction; and
   step (c) further comprises cranking the engine in the first direction.

10. A method for starting an engine, comprising:
    (a) before cranking the engine, preloading a spring of a torsion damper by transmitting torque, in a first direction, having a magnitude less than engine cranking torque from an electric motor through a clutch to the spring;
    (b) using the electric motor to crank the engine in the first direction in response to a command to start the engine.

11. The method of claim 10, wherein preloading the spring further comprises producing displacement of the spring.

12. The method of claim 10, wherein step (a) further comprises determining said magnitude of torque with reference to one of static friction torque of an engine crankshaft, engine auxiliary load and torque required for engine pistons to compress air in engine cylinders.

13. The method of claim 10, wherein the spring is preloaded through a range of spring displacement wherein a relatively low spring constant is operative.

14. The method of claim 10, wherein the spring performs as a damper through a range of spring displacement wherein a relatively high spring constant is operative while the engine is cranked and after the engine is started.

15. The method of claim 10, wherein step (b) further comprises:
    supplying fuel to the engine; and
    controlling engine speed to engine idle speed.

16. The method of claim 10, wherein preloading the spring further comprises producing angular displacement of the spring.

17. The method of claim 10 wherein:
    step (a) further comprises partially engaging the clutch to only allow less than a torque required to crank the engine; and
    step (b) further comprises increasing a torque capacity of the clutch prior to using the electric motor to crank the engine.

* * * * *